United States Patent
Larnholm

(10) Patent No.: US 7,488,361 B2
(45) Date of Patent: Feb. 10, 2009

(54) INLET AND DISTRIBUTION DEVICE

(75) Inventor: Per-Reidar Larnholm, Moss (NO)

(73) Assignee: FMC Technologies C.V., Amsterdam (NL)

( * ) Notice: Subject to any disclaimer, the term of this patent is extended or adjusted under 35 U.S.C. 154(b) by 281 days.

(21) Appl. No.: 10/569,091

(22) PCT Filed: Aug. 20, 2004

(86) PCT No.: PCT/EP2004/009365

§ 371 (c)(1),
(2), (4) Date: Oct. 25, 2006

(87) PCT Pub. No.: WO2005/018780

PCT Pub. Date: Mar. 3, 2005

(65) Prior Publication Data

US 2007/0044437 A1    Mar. 1, 2007

(30) Foreign Application Priority Data

Aug. 22, 2003    (NL) .................................... 1024149

(51) Int. Cl.
*B01D 50/00* (2006.01)
(52) U.S. Cl. .................... 55/318; 55/418; 55/459.1; 95/268
(58) Field of Classification Search .................. 55/318, 55/319, 320, 321, 337, 418, 440, 459.1, 525, 55/527; 95/268
See application file for complete search history.

(56) References Cited

U.S. PATENT DOCUMENTS

| | | | | |
|---|---|---|---|---|
| 1,739,093 A | * | 12/1929 | Ruby | ........................... 55/419 |
| 3,010,537 A | * | 11/1961 | Baker et al. | .................... 55/323 |
| 3,063,220 A | * | 11/1962 | Almquist | ...................... 96/246 |
| 3,997,303 A | * | 12/1976 | Newton | ........................ 95/284 |
| 4,297,116 A | | 10/1981 | Cusick | |
| 4,767,424 A | * | 8/1988 | McEwan | ....................... 55/329 |
| 5,676,717 A | | 10/1997 | Cope et al. | |
| 6,251,168 B1 | * | 6/2001 | Birmingham et al. | ......... 95/268 |
| 7,144,437 B2 | * | 12/2006 | Christiansen et al. | .......... 55/343 |
| 7,279,020 B2 | * | 10/2007 | Christiansen et al. | .......... 55/338 |
| 2005/0060970 A1 | * | 3/2005 | Polderman | .................... 55/320 |
| 2005/0204917 A1 | * | 9/2005 | Haland et al. | ................. 95/268 |
| 2007/0044437 A1 | * | 3/2007 | Larnholm et al. | .............. 55/319 |

FOREIGN PATENT DOCUMENTS

EP    0 195 464 A    9/1986

* cited by examiner

*Primary Examiner*—Duane S Smith
*Assistant Examiner*—Sonji Turner
(74) *Attorney, Agent, or Firm*—Harness, Dickey & Pierce PLC

(57) ABSTRACT

Separation device for separating a liquid/gas mixture in a heavy fraction mainly containing liquid and a light fraction mainly containing gas, comprising:—a separation vessel comprising at least one inlet, at least a first outlet for the discharge of the heavy fraction and at least a second outlet for the discharge of the light fraction,—separator for separating the mixture into the heavy and light fraction;—a vane type inlet device connected to the inlet for admitting the gas/liquid mixture to the vessel en for distributing the admitted gas/liquid mixture in the vessel, the inlet device comprising: an elongated support structure; is—a plurality of curved guiding vanes placed one behind the other and attached to the support structure, the guiding vanes being arranged so as intercept and deflect the admitted gas/liquid mixture sideways;—at least an agglomerator arranged close to the guiding vanes for agglomerating the liquid in the gas/liquid mixture.

29 Claims, 6 Drawing Sheets

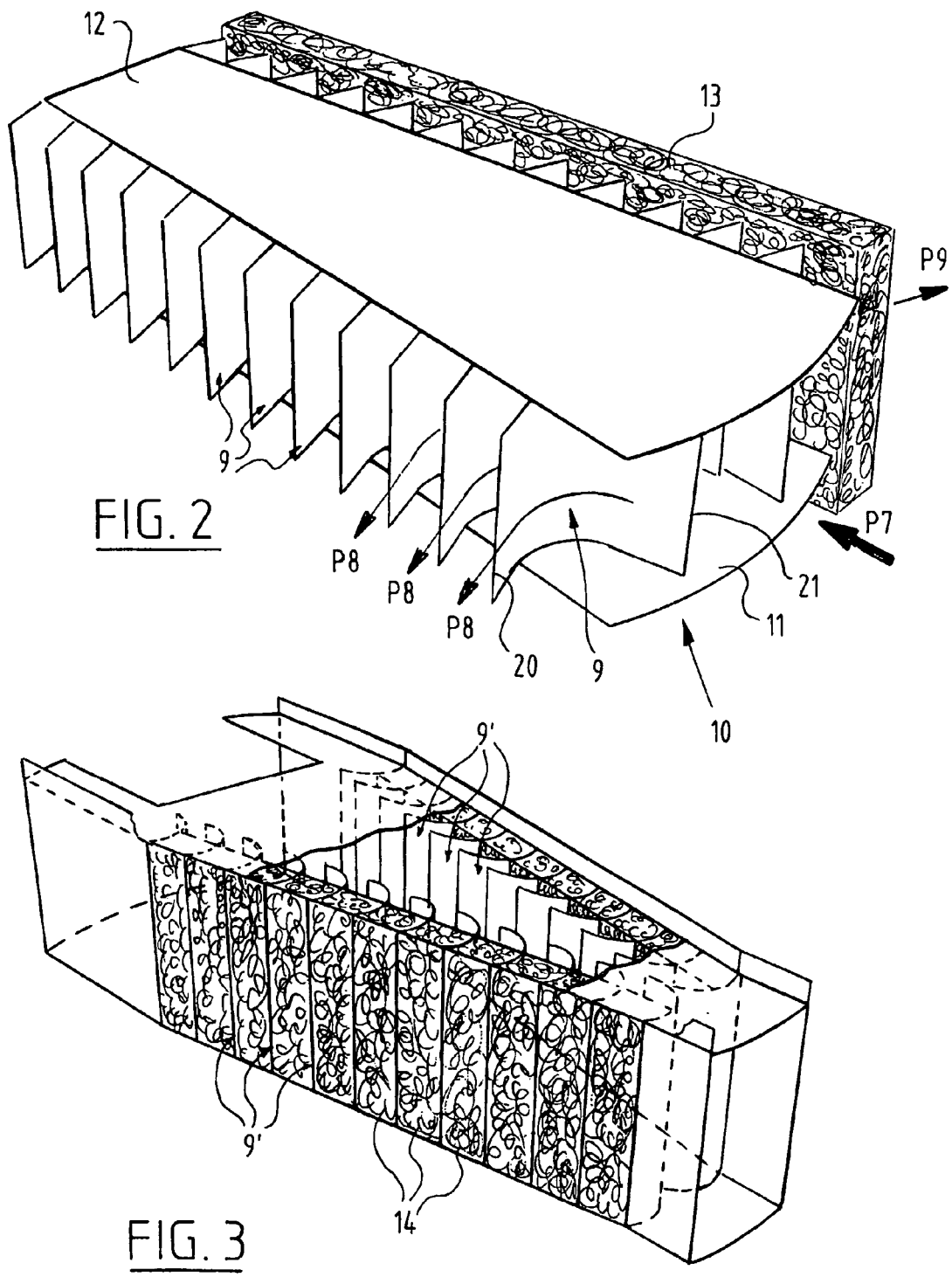

INLET AND DISTRIBUTION DEVICE

The present invention relates to an inlet and distribution device for pretreatment of a gas/liquid mixture that is to be separated in a separator. The present invention also relates to the separator itself and to a method for treating a gas/liquid mixture in a separation vessel.

Separators are known in the oil and gas industry for separating the incoming mixture of liquid (oil and/or water) and gas into a stream of substantially gas and a stream of substantially liquid. Different separators are known for separating such gas/liquid mixtures.

In one type of separator a separation vessel is provided in which a number of cyclones are arranged. The separation vessel typically comprises an inlet for admitting the liquid/gas mixture, a first outlet for the discharge of a separated heavy fraction of the mixture, i.e. a fraction of the mixture mainly containing the relatively heavy liquid, and an outlet for the discharge of the light fraction of the mixture, i.e. the fraction of the liquid mainly containing the gas. Separation is achieved by forcing the liquid/gas mixture through the cyclones.

WO 00/25931 discloses a separation vessel wherein a number of so-called axial recycle cyclones are arranged in an upper compartment of the vessel. The liquid/mixture enters a lower compartment of the vessel and is forced subsequently through the cyclones. The mixture entering an axial cyclone is set into a rotating movement, whereby the heavy fraction is flung against the outer wall of the cyclone, while the light fraction remains in the centre of the cyclone. The heavy fraction is then discharged through openings in the outer wall to a so-called downcomer leading the heavy fraction to the lower compartment of the vessel. The separated light fraction is discharged via an outlet in the upper compartment of the vessel.

The liquid/gas mixture will be subjected to a pre-treatment immediately after entering the separation vessel in order to improve the overall separation efficiency of the separator. A pre-treatment is also advisable to effect a proper separation of the mixture to the vessel at a rapid rate, since the mixture will otherwise strike the wall of the vessel situated opposite the inlet with considerable force, resulting in liquid particles being entrained to the upper compartment.

For the pre-treatment of the liquid/gas mixture inlet devices are known, in which the mixture entering the vessel is distributed so as to ensure a more uniform distribution over the cross section of the vessel. In a device known in the art as the "Evenflow" vane type inlet device a series of vanes is arranged inside the vessel in the extension of the centre line of the inlet, the vanes being arranged to catch the incoming mixture and deflect it sideways.

A drawback of the known inlet device is that in practice, especially in case the gas distribution in the inlet piping is poor or in case of a non-optimum pipe lay-out, the distribution of the mixture out of the device may be insufficient uniform. This will have a negative effect on the separating properties of the separator.

A further drawback is that the incoming stream will be subjected to additional shear forces meaning that the risk of liquid shearing is increasing. Liquid shearing must be avoided as this reduces the size of the liquid droplets to be separated in the separator. In general, the smaller the droplets are, the harder it will be to get a good separation inside the vessel.

A further drawback is that in the known separators the risk of re-entrainment from the liquid surface may be relatively high. When the vane type inlet device is not seeing a good inlet distribution the outlet distribution of gas out of the inlet device may be poor, leading to high local velocities. Hence high velocities may be observed on the liquid surface (the liquid surface being situated below the vane type inlet device in the liquid sump). When high gas velocities are seen on the liquid surface, the gas may entrain or pick up liquid from the liquid surface and transport the liquid upwards in the vessel. This results in increasing the liquid load on the downstream devices and hence reducing the efficiency of the separator.

U.S. Pat. No. 4,296,116 discloses a separation vessel provided with an inlet to which a diffuser is connected. Diffuser comprises a conical pipe provided with openings. The mixture originating from the flow line will enter the separation vessel through openings in the conical pipe. At a certain distance above the diffuser a coalescer is attached. Because the coalescer is arranged above the diffuser, also in the known separation vessel the chance of as a result of high gas velocities, liquid is entrained or picked-up from the liquid surface, which causes deterioration of the separation efficiency.

It is an object of the present invention to improve the separation characteristics of the known separators in general.

A further object of the present invention is provide an improved gas distribution on the downstream side of the inlet device.

A still further object of the present invention is to provide a separator in general or an inlet device in particular with a reduced risk of re-entrainment of liquid from the liquid surface.

According to a first aspect of the present invention this object is achieved in a separation device for separating a liquid/gas mixture in a heavy fraction mainly containing liquid and a light fraction mainly containing gas, comprising:

a separation vessel comprising at least one inlet, at least a first outlet for the discharge of the heavy fraction and at least a second outlet for the discharge of the light fraction, an inlet device connected to the inlet for admitting the gas/liquid mixture to the vessel en for distributing the admitted gas/liquid mixture in the vessel, separator for further separating the mixture into the heavy and light fraction;

agglomerator for agglomerating the liquid in the gas/liquid mixture, wherein the agglomerator is arranged downstream of the inlet in and/or below the inlet device.

The agglomerator causes agglomeration of the liquid, i.e. collecting or accumulating of the liquid in relatively large liquid droplets. The liquid droplets will drop back under the influence of the force of gravity into the lower compartment and fall into the liquid already present there, such that the overall separation efficiency of the vessel increases.

According to a preferred embodiment the inlet device is a vane type inlet device, comprising an elongated support structure and a plurality of curved guiding vanes placed one behind the other and attached to the support structure, the guiding vanes being arranged so as intercept and deflect the admitted gas/liquid mixture sideways, wherein the agglomerator is arranged between the guiding vanes, ensuring a sufficient pressure drop of the incoming mixture, helping the mixture to distribute itself.

According to a another preferred embodiment the agglomerator is arranged downstream of the guiding vanes. For example, especially in large vessels (with large diameters) the agglomerator (such as the wire mesh) will likely be fitted on the outlet face of the guiding vanes. The agglomerator may also be disposed both between the guiding vanes and downstream of the guiding vanes.

The agglomerator inside the vane type inlet device or at the outlet of the vane type inlet device will subject the gas to a pressure drop. A pressure drop will help the gas to distribute itself before leaving respectively just after leaving the vane type inlet device.

The local high velocities seen during non optimum inlet distribution is dampened due to the pressure drop. Dependent on applied pressure drop, which is dependent on the type of agglomerator used, an improved gas distribution out of the inlet device is seen. The gas distribution of the gas admitted to the inlet device may be poor, but the distribution downstream of the agglomerator will be almost uniform. Having a more uniform distribution out of the inlet device will ensure a better distribution on the downstream equipment, being for example a further wire mesh, a vane pack and/or a number of cyclones.

Since also less high local velocities are seen the gas will mainly flow upwards instead of downwards towards the liquid surface and hence the danger of liquid entrainment is reduced. Another positive effect is that the agglomerator will act as a coalescer, i.e as the gas and liquid droplets flow through the agglomerator (preferably a wire mesh) the liquid droplets will increase in size, resulting in an improved overall separator performance due to increased gravity separation and due to increased efficiency of the down stream equipment.

According to another preferred embodiment the agglomerator protrudes a pre-defined distance from the trailing ends of the guiding vanes. Test have shown that the pre-defined distance between 0 and 500 mm will particularly provide good results.

According to another preferred embodiment the separation vessel comprises a bottom part for collecting the heavy fraction and the agglomerator is arranged between the inlet device and the bottom part. Also in this embodiment the chance of entrainment from the liquid surface is diminished. The liquid trapped in the agglomerator, preferably a wire mesh, will drain down through the mesh and fall into the liquid in the bottom part of the vessel. In this embodiment various types of inlet devices may be employed, for example the above-mentioned vane type inlet device or an inlet device based on the cyclone technique. Inlet devices of the cyclone type as such are already known in this field of technology.

According to a further preferred embodiment the agglomerator is arranged over substantially the full cross-section of the separation vessel. According to another preferred embodiment the agglomerator is arranged over only a part of the cross-section of the separation vessel. This depends inter alia on the degree of skew distribution seen in the inlet device.

Preferably the agglomerator is arranged only along those parts of the vessel wall that are situated sideways of the inlet device. For example, in case of using a vane type inlet device the agglomerator (preferably a wire mesh) will need to be arranged along the vessel wall perpendicular to the outlet face of the device only, while the agglomerator along the other parts of the vessel wall can be dispensed with. In case of using a cyclone type inlet device the agglomerator will normally need to be arranged along the whole perimeter of the vessel.

As mentioned above the agglomerator is preferably embodied in a mesh, preferable in the form of a number of layers of metal gauze or metal wires. The liquid droplets in the mixture that is directed through the mesh pads collide with the wires and grow herewith into a liquid layer, thereby increasing the separation efficiency of the separator. Other types of agglomerator can however also be applied, such as one or more layers of structured or random packing or of vanes or vane packs, for example as disclosed in Perry's Chemical Engineer's Handbook, 7$^{th}$ edition, page 14-40, FIGS. 14-45a and 14-45b. Any porous medium with a void fraction of 50 to 99.9% is in fact suitable.

Preferably the vane type inlet device should divert the incoming fluid horizontally. If diverted vertically upwards a poor gas distribution may be seen on downstream equipment in vertical vessels. For horizontal vessels liquid entrainment from liquid surface may arise since gas leaving the inlet device hits the vessel top and is diverted down towards the liquid surface. If the gas/liquid is diverted vertically downwards in both vertical and horizontal vessels, there may be high velocities on the liquid surface with corresponding high risk of liquid entrainment from the surface.

According to another aspect of the present invention an inlet device is provided, preferably the inlet device as specified above, for pre-treatment of a gas/liquid mixture to be separated in a separation vessel, the separation vessel including at least an inlet for admitting the gas/liquid mixture to a bottom part of the vessel, means for separating the gas/liquid mixture in a heavy fraction mainly containing liquid and a light fraction mainly containing gas, a first outlet for discharging the heavy fraction and a second outlet for discharging the light fraction, the inlet device comprising:

an elongated support structure to be connected to the inlet, the support structure being provided with at least a partly open side;

a plurality of curved guiding vanes placed one behind the other and arranged at least partly within the support structure, the guiding vanes being arranged so as intercept and deflect the admitted gas/liquid mixture towards the bottom part of the separation vessel;

agglomerator arranged close to the guiding vanes for agglomerating the liquid in the gas/liquid mixture.

According to another preferred embodiment the agglomerator is attached to a separate support arranged in the vessel. Especially in retrofit situations the application of a separate support enables an relatively easy and cost effective implementation.

According to another aspect of the present invention a method is provided for treating a gas/liquid mixture in the above defined separation vessel, the method comprising the steps of:

feeding the gas/liquid mixture through a wire mesh into the lower compartment of the vessel;

guiding a part of the mixture through one or more cyclone separators in the upper part of the vessel and carrying the separated liquid part back to the lower compartment and carrying the separated gas part to the second outlet;

discharging the mixture from the lower compartment from the first outlet; and discharging the mixture from the upper compartment from the second outlet.

Further advantages, features and details of the present invention will follow from the description of preferred embodiments thereof. References is made in the description to the figures, in which:

FIG. 2 shows a perspective view of a first preferred embodiment of a vane type inlet device;

FIG. 3 shows a partly cut-away perspective view of a second embodiment of a vane type inlet device;

Figure 1:
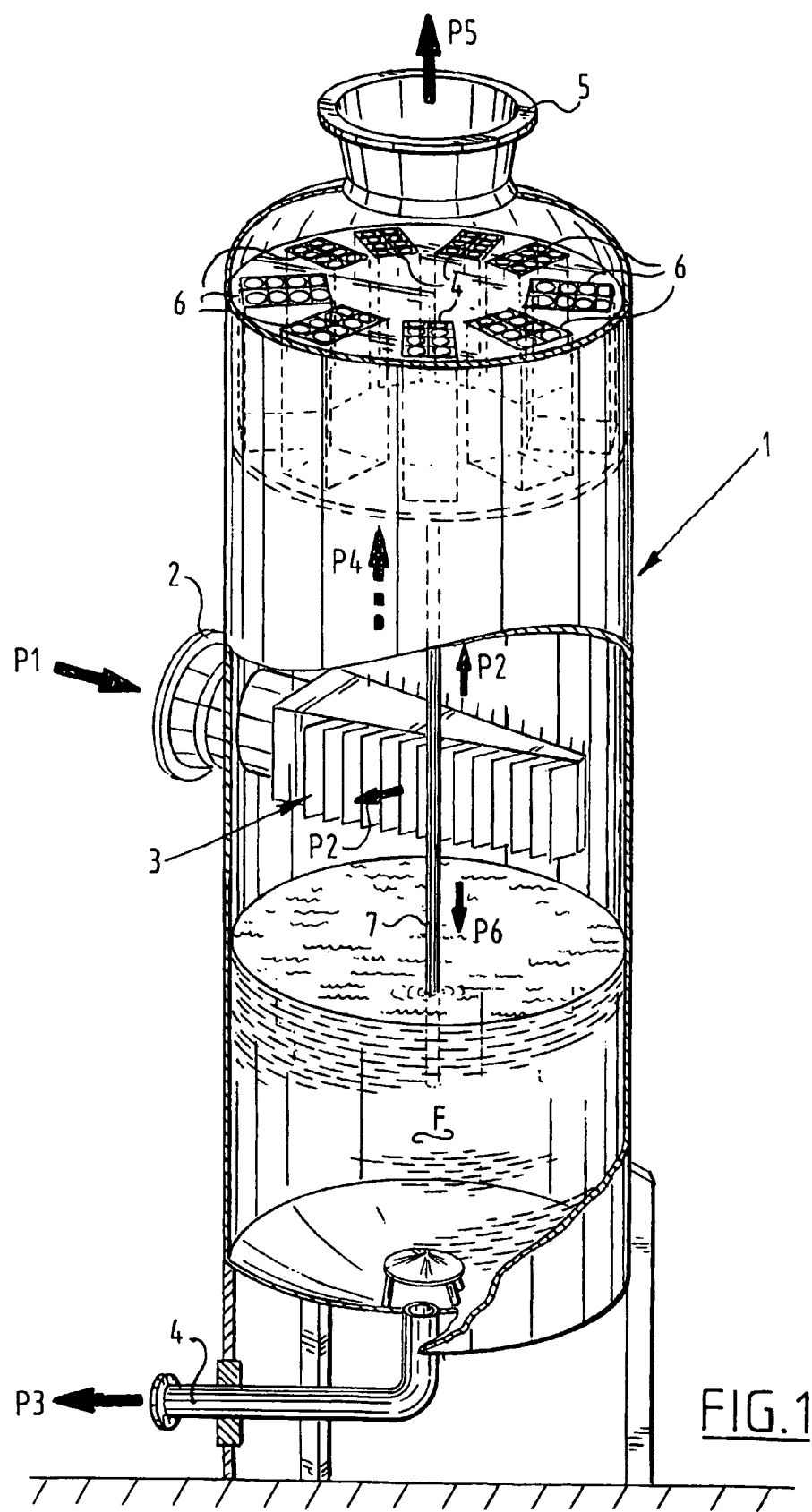
FIG. 1 shows a partly cut-away perspective view of a separator for separating a mixture of gas and liquid.
Figure 4:
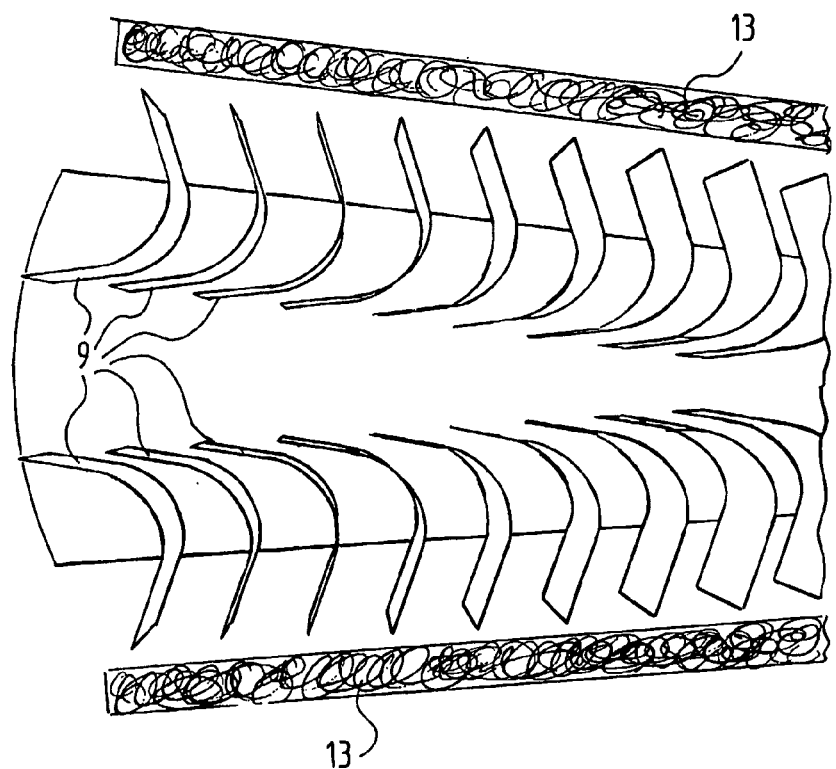
FIG. 4 shows a cross-section of the vane type inlet device shown in FIG. 2.

FIG. 1 shows an upright separating vessel 1 for separating a pressurized flow of a gas/liquid mixture, such as natural gas mixed with (salt sea-)water, into a substantially gas-containing fraction, also referred to as light fraction, and a substantially liquid-containing (water and/or oil) fraction, also referred to as heavy fraction. Vessel 1 is provided with a connecting stub 2 for in feed of the gas/liquid mixture, a connecting stub for a liquid discharge conduit 4 for discharge of the heavy fraction and a connecting stub 5 for discharge of the light fraction.

The gas/liquid flow introduced in the vessel 1 ($P_1$) is guided by a pre-treatment unit 3 to a lower compartment A of vessel 1. In the shown embodiment the pre-treatment unit 3 is formed by a number of curved blades or vanes which uniformly absorb the moment of the incoming gas/liquid flow. The vanes subsequently guide the gas/liquid flow laterally ($P_2$) into the lower compartment of the separating vessel. As a result of this controlled entry of the gas/liquid mixture a first part of the liquid (F) will already be separated and accumulate at the bottom of the vessel 1 ($P_3$).

The separated part of the mixture which, although it contains less liquid than the mixture supplied from outside, still has a considerable liquid content, is then displaced upward ($P_4$). The liquid, which still is present in relatively large droplets, is further separated by a number of cyclones 6. The cyclones are arranged in a plurality of boxes in the upper compartment B of the vessel 1. Provided downstream thereof is the connecting stub 5 for discharging the light fraction (mainly gas) which has been dried to a considerable extent. The cyclones are connected to one or more downcomers 7 which are in communication with liquid F at the bottom of the vessel for draining liquid from each of the cyclones.

Preferably the cyclones are axial recycle cyclones as disclosed in the aforementioned document WO 00/25931. A general description of the separation performed by axial recycle cyclones is incorporated herein by reference.

FIG. 2 shows a vane type inlet device 10, which comprises a bottom plate 11 and a top plate 12. Between the plates a number of partly straight partly curved guiding vanes 9 are arranged. The guiding vanes are designed so as to guide the incoming flow sideways.

A liquid/gas flow entering the inlet device ($P_7$) is intercepted by the leading edge 21 of a guiding vane 9 and deflected laterally ($P_8$). Downstream of the trailing end 20 of the guiding vanes 9 a wire mesh 13 is arranged. The wire mesh 13 can be attached to the inlet device 10 itself, for example to its support plates 11 and 12, or may be connected to a separate frame, that is attached directly to the separation vessel 1 itself. The wire mesh pad is a layer of tightly packed wires, the layer being arranged vertically, downstream of the guiding vanes.

FIG. 3 shows another embodiment of the present invention. In this embodiment a vane type inlet device of a different design, also known as the "Evenflow" inlet device, is applied. The Evenflow inlet device differs from the device shown in FIG. 2 in a number of aspects, the most important ones being that the guiding vanes are curved over their total length, the guiding vanes are maintained between the borders of the upper and lower plates 11,12 and that the interspace between the successive guiding vanes increases in the direction of the mixture flow ($P_8$). The basic principle of intercepting the mixture flow and deflecting the flow towards the wall of the vessel, is however the same.

In this embodiment a number of mesh pads 14 is arranged between the guiding vanes 9'. The mesh pads 14, as shown in FIG. 3, are arranged close to the trailing end of the vanes. They may, however, also be arranged close to the leading edge of the vanes or along the entire area of the vanes.

Figure 5:
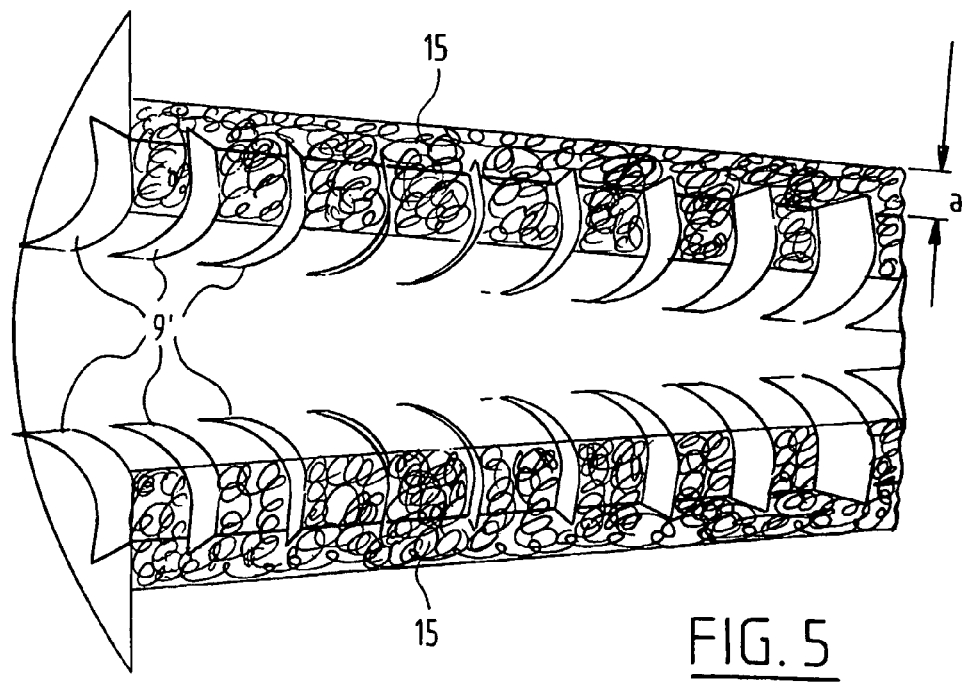
FIG. 5 shows a cross-section of a further preferred embodiment of a vane type inlet device.

FIG. 5 shows another preferred embodiment of an inlet vane type device according to the design of the Evenflow inlet device. In this embodiment the mesh pad 15 is not only arranged between the guiding vanes 9', but also downstream of the guiding vanes. In fact the mesh pad 15 protrudes over a distance (a) of 0-500 millimeter from the trailing edges of the respective guiding vanes.

Figure 6:
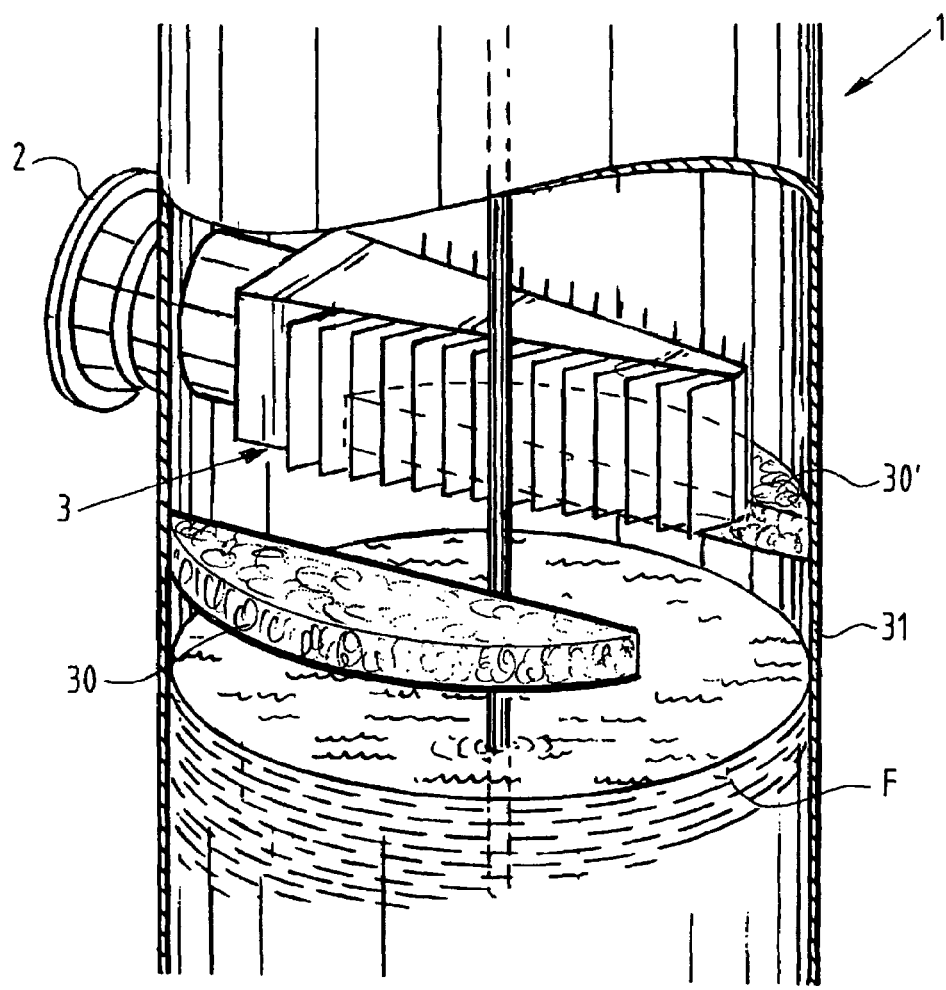
FIG. 6 shows a partially cut away perspective view of a separator provided with another embodiment of an inlet device according to the present invention, wherein the mesh is situated on a position between the inlet and the liquid surface.

FIG. 6 shows another preferred embodiment of the separator according to the invention. The figure shows a separating vessel 1 provided with a vane-type inlet device 3 as discussed above. Instead of the vane type inlet device other inlet devices are feasible, such as a cyclone type inlet device or a similar device. Shown is a wire mesh 30 that is situated on a position between the inlet 2 of the separator 1 and the surface of the liquid f accumulated at the bottom of the vessel. Shown is a particular embodiment wherein the wire mesh is divided in two mesh parts 30,30', being arranged adjacent to the wall 31 of the vessel. Between the mesh parts 30,30' an opening is left. The incoming mixture will be deflected sideways and be forced through the two wire mesh parts 30, 30'. Both wire mesh parts will retain some of the liquid contained in the gas, which liquid will drop down into the fluid F already present there. The remaining part of the mixture will be forced upward, mainly through said opening between both wire mesh parts 30,30'. The opening is provided in order to improve the upward flow of the mixture (mainly containing gas).

The opening has an elongated shape, but can be shaped differently depending on the specific type of separation used, the characteristics of the incoming mixture, et cetera. In particular cases wherein there are large skew distributions and the inlet devices are heavily loaded (i.e. high gas loads), the mesh pad must be made larger and hence the opening is chosen to be smaller.

The wire mesh can alternatively be formed so as to cover the entire cross section of the vessel 1. In many circumstances this embodiment is preferred since it will provide a very uniform distribution of the mixture.

Figure 7:
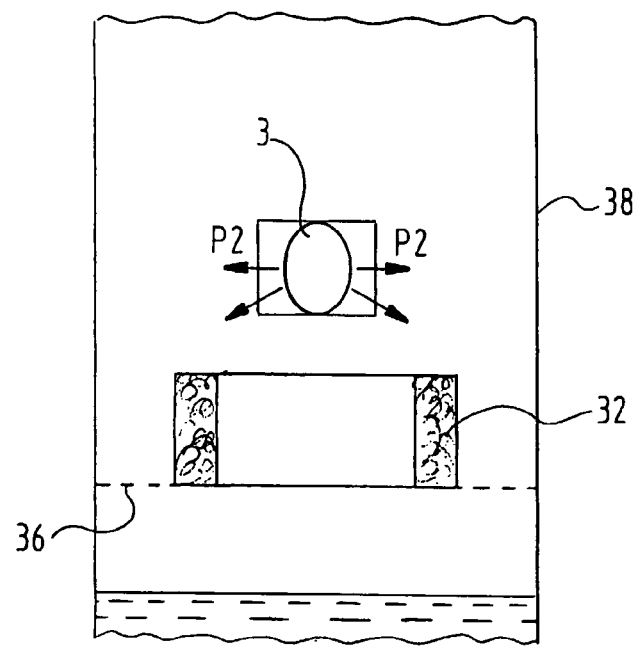
FIG. 7 shows schematically a cross-section of a preferred embodiment of a vessel with vertical arranged wire mesh pads.

FIG. 7 shows a further preferred embodiment of the invention wherein the inlet device, e.g. a vane type inlet device, is schematically shown and the wire mesh is arranged vertically in the vessel 1. The wire mesh is in this embodiment attached to a support structure 31, comprising a solid plate or, preferably, a further wire mesh, perforated plate or a structured/random packing. The mixture flowing sideways out of the inlet device 3 will be more uniformly distributed in the vessel by the shown arrangement of the wire mesh 32.

Figure 8:
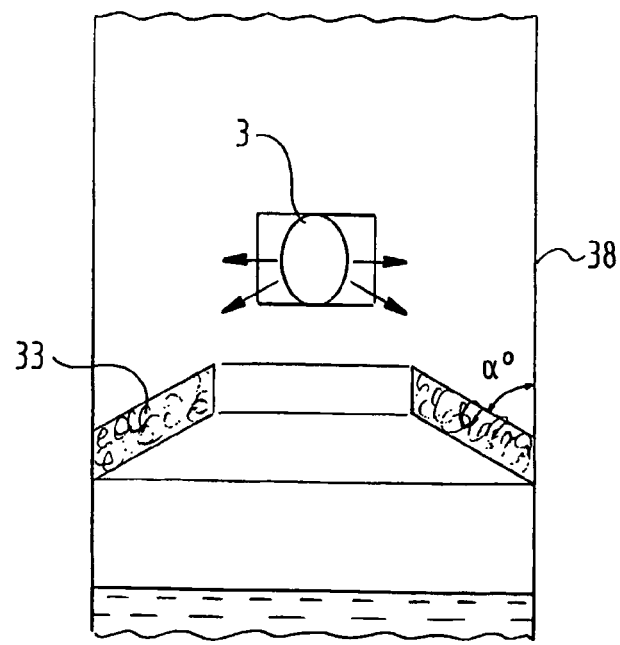
FIG. 8 shows schematically a cross-section of a preferred embodiment of a vessel with inclined mesh pads.

FIG. 8 shows the embodiment of FIG. 3, wherein the mesh 33 is arranged at an angle α ($10°<α<170°$) to the vessel wall, extending upwards or downwards. The mesh 33 is attached directly to the vessel wall 38.

Figure 9:
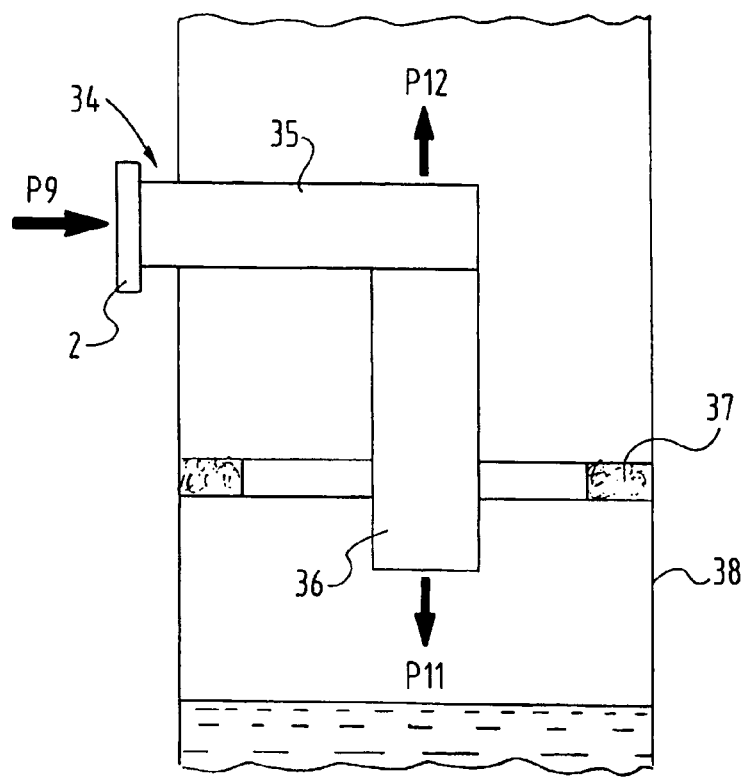
FIG. 9 shows schematically a cross-section of a preferred embodiment of a vessel provided with a cyclone type inlet device.
Figure 10:
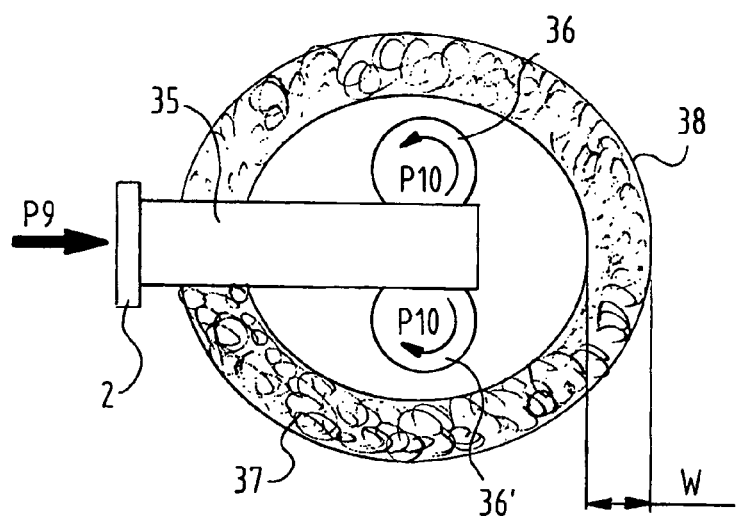
FIG. 10 shows a cross-section of the embodiment of FIG. 9.

FIGS. 9 and 10 show cross-sections of a further preferred embodiment of the present invention. In this embodiment a cyclone type inlet device 34 is employed. The inlet device 34 comprises a horizontal tube 35 which is connected to two cyclones 36,36'. Each cyclone comprises a tangential inlet, forcing the mixture coming from the tube 35 to rotate ($P_{10}$). Under the influence of the rotating movement of the mixture inside the cyclones 36,36' a heavy fraction of the mixture is discharged downward ($P_{11}$), while a light fraction of the mixture is discharged upward ($P_{12}$). For a further description of a cyclone type inlet device referral is made to the international publication WO 00/74815 A2 of the present applicant, which is incorporated here by reference.

FIGS. 9 and 10 show that the mesh pad in this embodiment is arranged along the whole perimeter of the vessel wall 38. The width W of the wire mesh 37 will depend from case to case. Instead of being only a strip along the vessel wall, as is shown in FIG. 10, the wire mesh may cover the whole area (excluding the area occupied by the inlet cyclones 36,36' themselves) or only different strips on parts of the vessel wall 38.

As mentioned above, the dimensions and shape of the opening between the two wire mesh pads will in practice depend on the specific separating requirements and/or the quality of the incoming mixture. Other configurations or layouts of mesh pads inside the separation vessel may also be advantageous.

The present invention is not limited to the above described embodiments thereof; the rights sought are defined by the following claims, within the scope of which many modifications can be envisaged.

Although in the above description of preferred embodiments of the present invention an upright separating vessel is shown, it will be appreciated that the invention also applies to horizontally of obliquely arranged separating vessels.

The invention claimed is:

1. Separation device for separating a liquid/gas mixture in a heavy fraction mainly containing liquid and a light fraction mainly containing gas, comprising:
    a separation vessel comprising at least one inlet, at least a first outlet for the discharge of the heavy fraction and at least a second outlet for the discharge of the light fraction,
    an inlet device connected to the inlet for admitting the gas/liquid mixture to the vessel and for distributing the admitted gas/liquid mixture in the vessel, wherein the inlet device is a vane type inlet device, comprising an elongated support structure and a plurality of curved guiding vanes placed one behind the other and attached to the support structure, the guiding vanes being arranged so as intercept and deflect the admitted gas/liquid mixture sideways,
    a separator for further separating the mixture into the heavy and light fraction;
    an agglomerator for agglomerating the liquid in the gas/liquid mixture, wherein the agglomerator is arranged in and/or below the inlet device and downstream of the inlet.

2. Separation device according to claim 1, wherein the agglomerator is arranged between the vanes.

3. Separation device according to claim 1, wherein the agglomerator is arranged downstream of the guiding vanes.

4. Separation device according to claim 2, wherein the inlet device is arranged substantially horizontally in an upright separation vessel and the guiding vanes are arranged so as to deflect the incoming mixture substantially horizontally.

5. Separation device according to claim 1, wherein the inlet device is a cyclone type inlet device.

6. Separation device according to claim 1, wherein the separation vessel comprises a bottom part for collecting the heavy fraction and wherein the agglomerator is arranged between the inlet device and the bottom part.

7. Separation device according to claim 6, wherein the agglomerator is arranged over substantially the full cross-section of the separation vessel.

8. Separation device according to claim 6, wherein the agglomerator is arranged over only a part of the cross-section of the separation vessel.

9. Separation device according to claim 6, wherein the agglomerator is arranged along those parts of the vessel wall that are situated sideways of the inlet device.

10. Separation device according to claim 1, wherein the agglomerator is attached to a separate support arranged in the vessel.

11. Separation device according to claim 1, wherein the separator comprise one or more cyclone separators.

12. Separation device according to claim 1, wherein the agglomerator is arranged substantially vertically in the separation vessel, the agglomerator being attached to a support structure.

13. Separation device according to claim 1 wherein the agglomerator extends at an angle between +/−90 degrees relative to the vessel wall.

14. Separation device according to claim 1 wherein the agglomerator is formed by a strip of wire mesh arranged along the inner perimeter of the vessel wall.

15. Inlet device for pre-treatment of a gas/liquid mixture to be separated in a separation vessel, the inlet device being mountable on the separation vessel including at least an inlet for admitting the gas/liquid mixture to a bottom part of the vessel, means for separating the gas/liquid mixture in a heavy fraction mainly containing liquid and a light fraction mainly containing gas, a first outlet for discharging the heavy fraction and a second outlet for discharging the light fraction, the inlet device comprising:
    an elongated support structure to be connected to the inlet, the support structure being provided with at least a partly open side;
    a plurality of curved guiding vanes placed one behind the other and arranged at least partly within the support structure, the guiding vanes being arranged so as intercept and deflect the admitted gas/liquid mixture towards the bottom part of the separation vessel; and
    one or more agglomerators arranged between the guiding vanes for agglomerating the liquid in the gas/liquid mixture.

16. Inlet device according to claim 15, wherein said one or more agglomerators are arranged downstream of the guiding vanes, the agglomerators being attached to the inlet device.

17. Inlet device according to claim 15, wherein said one or more agglomerators are attached to said support structure of the inlet device.

18. Inlet device according to claim 15, wherein the one or more agglomerators are arranged on the face of the outflow area of the guiding vanes.

19. Inlet device according to claim 15, wherein the one or more agglomerators protrude a predetermined distance from the trailing ends of the guiding vanes.

20. Inlet device according to claim 19, wherein the determined distance is between 0 and 500 mm.

21. Inlet device according to claim 15, wherein the leading end of a guiding vane makes a sharp angle with the direction of the flow of the admitted liquid/gas mixture.

22. Inlet device according to claim 15, wherein the guiding vanes are placed at such a distance from each other that a substantially uniform distribution of liquid and gas is obtained.

23. Inlet device according to claim 22, wherein the distance between successive guiding vanes increases in the direction of the liquid/gas flow.

24. Inlet device according to claim 15, wherein the support structure comprises a top plate and a bottom plate between which the guiding vanes are arranged, the guiding vanes being maintained between the borders of the top and bottom plate.

25. Inlet device according to claim 15, wherein the guiding vanes are arranged in pairs opposite each other, so that each pair deflects part of the admitted liquid/gas mixture towards two opposite sides.

26. Inlet device according to claim 15, wherein the one or more agglomerators comprise a wire mesh.

27. Method for admitting gas/liquid mixture to a separation vessel and subsequently distributing the liquid and gas in the vessel, the gas/liquid mixture being passed through a device as claimed in claim 1.

28. Method for treating a gas/liquid mixture in a separation vessel according to claim 1, comprising the steps of:

feeding the gas/liquid mixture through a wire mesh into the lower compartment of the vessel;

guiding a part of the mixture through one or more cyclone separators in the upper part of the vessel and carrying the separated liquid part back to the lower compartment and carrying the separated gas part to the second outlet;

discharging the mixture from the lower compartment from the first outlet;

discharging the mixture from the upper compartment from the second outlet.

29. Method as claimed in claim 28, wherein the mixture contains natural gas and oil.

* * * * *

UNITED STATES PATENT AND TRADEMARK OFFICE
CERTIFICATE OF CORRECTION

PATENT NO. : 7,488,361 B2  
APPLICATION NO. : 10/569091  
DATED : February 10, 2009  
INVENTOR(S) : Per-Reidar Larnholm and Rombout Adriaan Swanborn It is certified that error appears in the above-identified patent and that said Letters Patent is hereby corrected as shown below:

On the Title Page, should read,

Item (75) Inventors: Per-Reidar Larnholm, Moss (NO)

Rombout Adriaan Swanborn, Arnhem (NL)

Signed and Sealed this

Twenty-fourth Day of March, 2009

JOHN DOLL  
*Acting Director of the United States Patent and Trademark Office*